Dec. 22, 1959     S. R. WESTON     2,918,373
TEA BAG DEVICE
Filed March 28, 1958
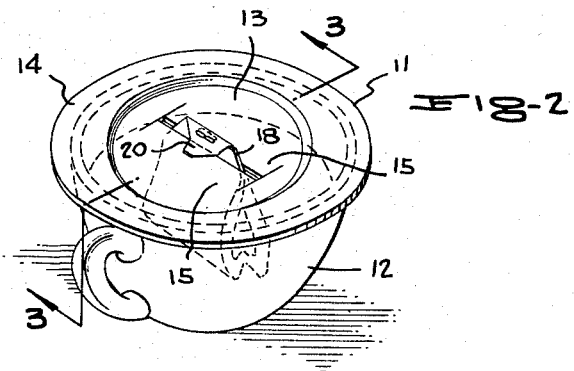
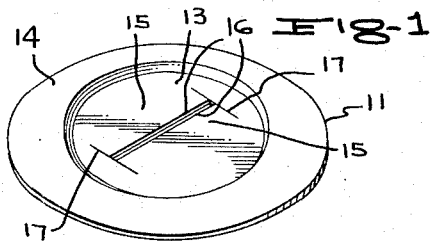
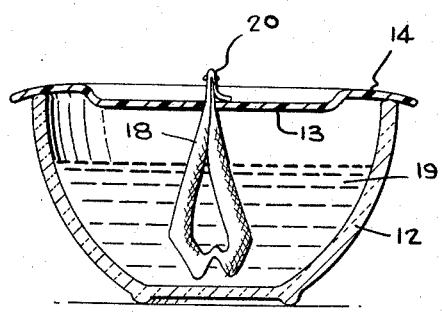
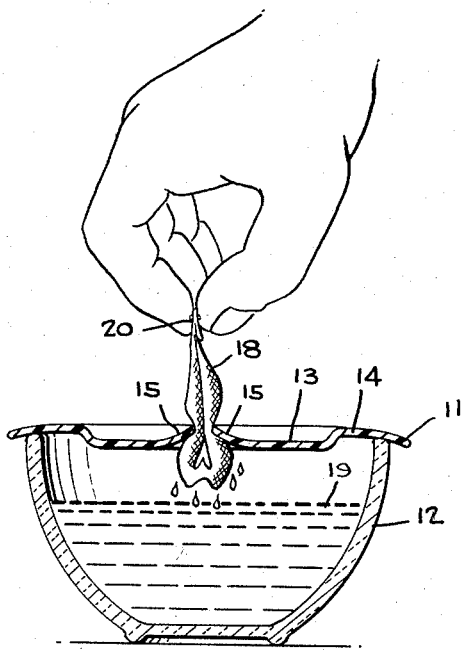
INVENTOR.
SYDNEY R. WESTON
BY
McMorrow, Berman + Davidson
ATTORNEYS

United States Patent Office 2,918,373
Patented Dec. 22, 1959

2,918,373

TEA BAG DEVICE

Sydney R. Weston, Silver Spring, Md., assignor of one-half to Harold J. Weisblut, Alexandria, Va.

Application March 28, 1958, Serial No. 724,670

4 Claims. (Cl. 99—77.1)

This invention relates to beverage making devices, and more particularly to a tea brewing device of the type including a tea bag.

A main object of the invention is to provide a novel and improved device for supporting a tea bag in a cup of hot water, said device being arranged so that the tea bag can be subsequently withdrawn therefrom in a manner whereby the maximum amount of liquor is squeezed from the bag, the device being arranged to prevent heat loss from the cup, and to insure maximum infusion of the tea bag in the hot water contained in the cup.

A further object of the invention is to provide an improved supporting device for suspending a tea bag in a cup of hot water and for subsequently allowing the tea bag to be withdrawn, the device being simple in construction, being inexpensive to manufacture, and being substantially indestructible, whereby it may be used over a long period of time.

Further objects and advantages of the invention will become apparent from the following description and claims, and from the accompanying drawings, wherein:

Figure 1 is a perspective view of a supporting disc member adapted to be employed with a tea bag in accordance with the present invention.

Figure 2 is a perspective view showing the disc member of Figure 1 operatively engaged on a tea cup and supporting a tea bag therein.

Figure 3 is an enlarged vertical cross sectional view taken on the line 3—3 of Figure 2.

Figure 4 is a view similar to Figure 3 but showing the tea bag being extracted from the tea cup through the supporting disc.

Referring to the drawings, Figure 1 shows a disc member, designated generally at 11, adapted to be placed on the rim of a tea cup 12. Thus, the disc member 11 comprises a circular inner portion 13 which is slightly depressed relative to the peripheral portion of the disc, said peripheral portion comprising the downwardly concave annular flange 14. As shown in Figure 3, the annular flange 14 is relatively shallow in depth, but is adapted to receive the rim of a tea cup 12 so as to support the depressed inner portion 13 substantially centrally over the tea cup.

The central portion 13 is formed with a pair of opposing substantially rectangular resilient fingers 15, 15, the fingers being of substantial width and having closely adjacent straight free end edges 16, 16 which are spaced symmetrically on opposite sides of a diameter of the disc member 11. The edges 16 are thus symmetrically spaced on opposite sides of said diameter and are parallel thereto.

The fingers 15, 15 may be defined by forming respective slits 17, 17 in the central portion 13 of disc member 11, said slits being parallel to each other and being preferably located at similar distances from the center of the disc member 11, as shown in Figure 1. The slits 17, 17 are spaced apart by a sufficient distance so that the finger elements 15, 15 thus defined are of sufficient width to easily receive a conventional tea bag 18 therebetween, the spacing of the edges 16, 16 being close enough so that the tea bag 18 will be yieldably gripped between said edges under normal conditions.

In using the device, a tea bag 18 is engaged between the edges 16, 16 and the disc member 11 is placed on the cup 12 whereby the tea bag 18 is suspended in the hot water 19 in the cup, as shown in Figure 3. After a suitable period of infusion, the tea bag may be extracted by grasping its top portion 20 and elevating same through the slot defined between the fingers 15, 15, the edges 16, 16 of the fingers engaging the tea bag as it is drawn upwardly, and the fingers being flexed upwardly, as shown in Figure 4, whereby the liquor in the tea bag is squeezed out of the bag and drops into the tea cup 12. Thus, the infusion material is utilized to maximum advantage and the tea bag is extracted from the disc member 11 in a manner whereby it has been substantially squeezed and may be easily handled without excessive dripping.

It will be further noted that the disc member 11 serves as a heat-retaining cover, so that during the infusion period heat loss from the hot water 19 is minimized.

The disc member 11 may be made of any suitable material having a substantial degree of heat resistance, for example, may be made of plastic material as illustrated in the drawings. Alternatively, the disc member 11 may be made of any suitable non-corrosive sheet metal, such as aluminum, brass, stainless steel, or the like.

While a specific embodiment of an improved device for supporting a tea bag in a tea cup has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a disc member adapted to be placed on the rim of a cup, a pair of opposing resilient finger elements formed in said disc member, said finger elements having closely adjacent, straight, substantially parallel free end edges, and a porous bag of beverage infusion material grippingly engaged between said edges and being at times movable upwardly therebetween, said finger elements being of sufficient width to receive said porous bag therebetween and the spacing between said free end edges being sufficiently close so that the bag will be yieldably gripped therebetween, whereby liquor may be squeezed from the bag when said bag is drawn upwardly relative to the disc member.

2. In combination, a disc member adapted to be placed on the rim of a cup, a pair of opposing, substantially rectangular resilient finger elements formed in said disc member, said finger elements having closely adjacent straight free end edges located substantially parallel to and spaced substantially symmetrically on opposite sides of a diameter of said disc member, and a porous bag of beverage infusion material grippingly engaged between said edges and being at times movable upwardly therebetween, said finger elements being of sufficient width to receive said porous bag therebetween and the spacing between said free end edges being sufficiently close so that the bag will be yieldably gripped therebetween, whereby liquor may be squeezed from the bag when said bag is drawn upwardly relative to the disc member.

3. In combination, a disc member, a peripheral downwardly concave annular flange on said disc member adapted to be placed on the rim of a cup, a pair of opposing substantially rectangular resilient finger elements formed on said disc member on opposite sides of a diameter thereof, said finger elements having closely adjacent straight free end edges arranged substantially parallel to and spaced substantially symmetrically on opposite sides of said diameter, and a porous bag of beverage infusion material grippingly engaged between said edges and being at times movable upwardly therebetween, said finger elements being of sufficient width to receive said porous bag therebetween and the spacing between said free end edges being sufficiently close so that the bag will be yieldingly gripped therebetween, whereby liquor may be squeezed from the bag when said bag is drawn upwardly relative to the disc member.

4. In combination, a disc member adapted to be placed on the rim of a cup, said disc member being formed with parallel slits and being further formed between said slits to define a pair of opposing substantially rectangular resilient fingers having closely adjacent, straight, substantially parallel free end edges, a porous bag of infusion material grippingly engaged between said edges and being at times movable upwardly therebetween, said slits being spaced apart sufficiently so that the bag may be received between said fingers, said free end edges being spaced to yieldably grip the bag between said edges, whereby liquor may be squeezed from the bag when the bag is drawn upwardly relative to the disc member.

References Cited in the file of this patent
UNITED STATES PATENTS

| | | |
|---|---|---|
| 1,603,024 | Childs | Oct. 12, 1926 |
| 2,436,291 | Daniel | Feb. 17, 1948 |
| 2,728,670 | Young et al. | Dec. 27, 1955 |
| 2,728,671 | Young et al. | Dec. 27, 1955 |
| 2,728,672 | Young et al. | Dec. 27, 1955 |